Jan. 2, 1962 E. C. COOK 3,015,600
PLASTIC FILM CUTTER AND SEALER
Filed Feb. 4, 1957 4 Sheets-Sheet 1
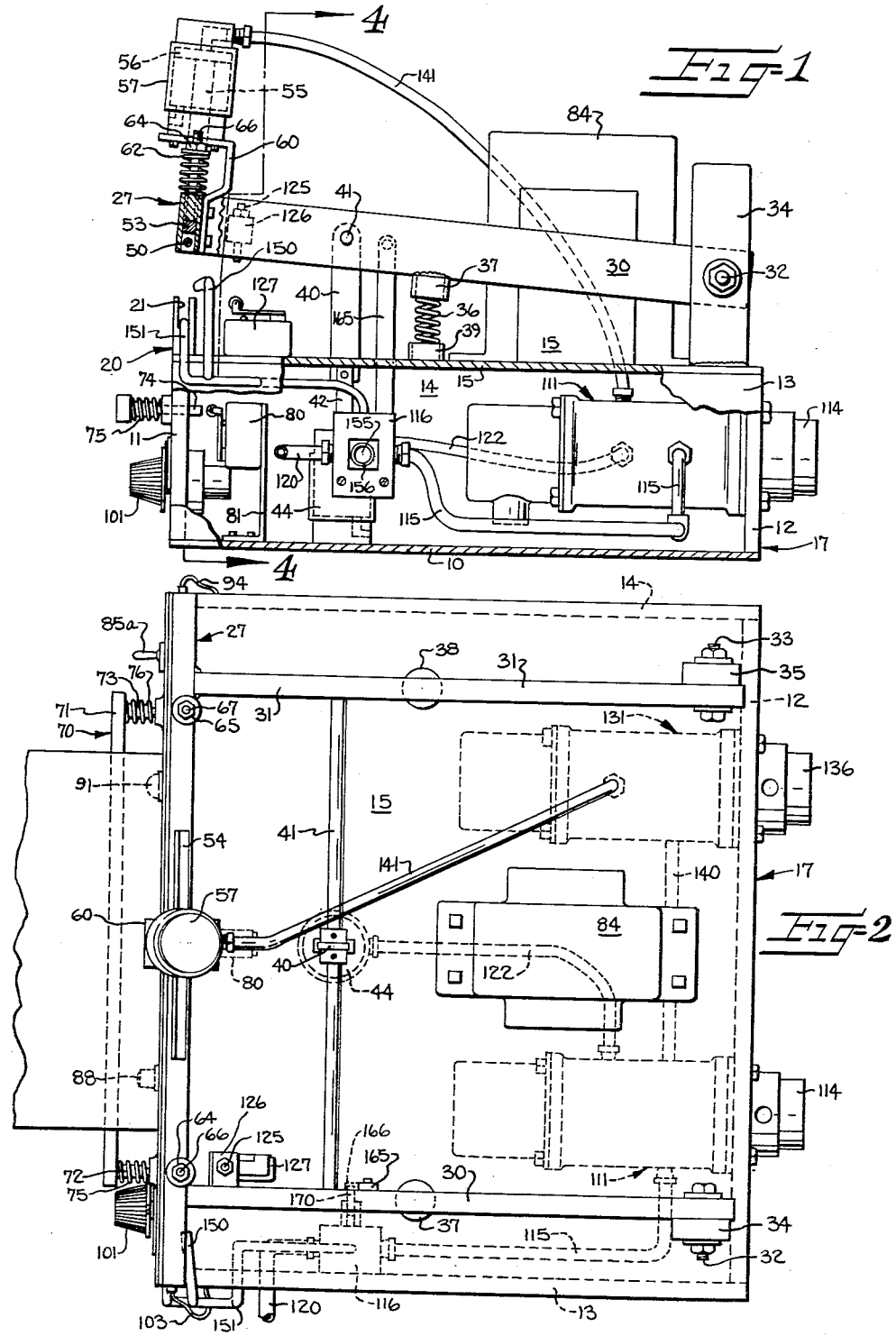

INVENTOR:
EUGENE C. COOK.

BY Eaton, Bell, Hunt + Seltzer
ATTORNEYS

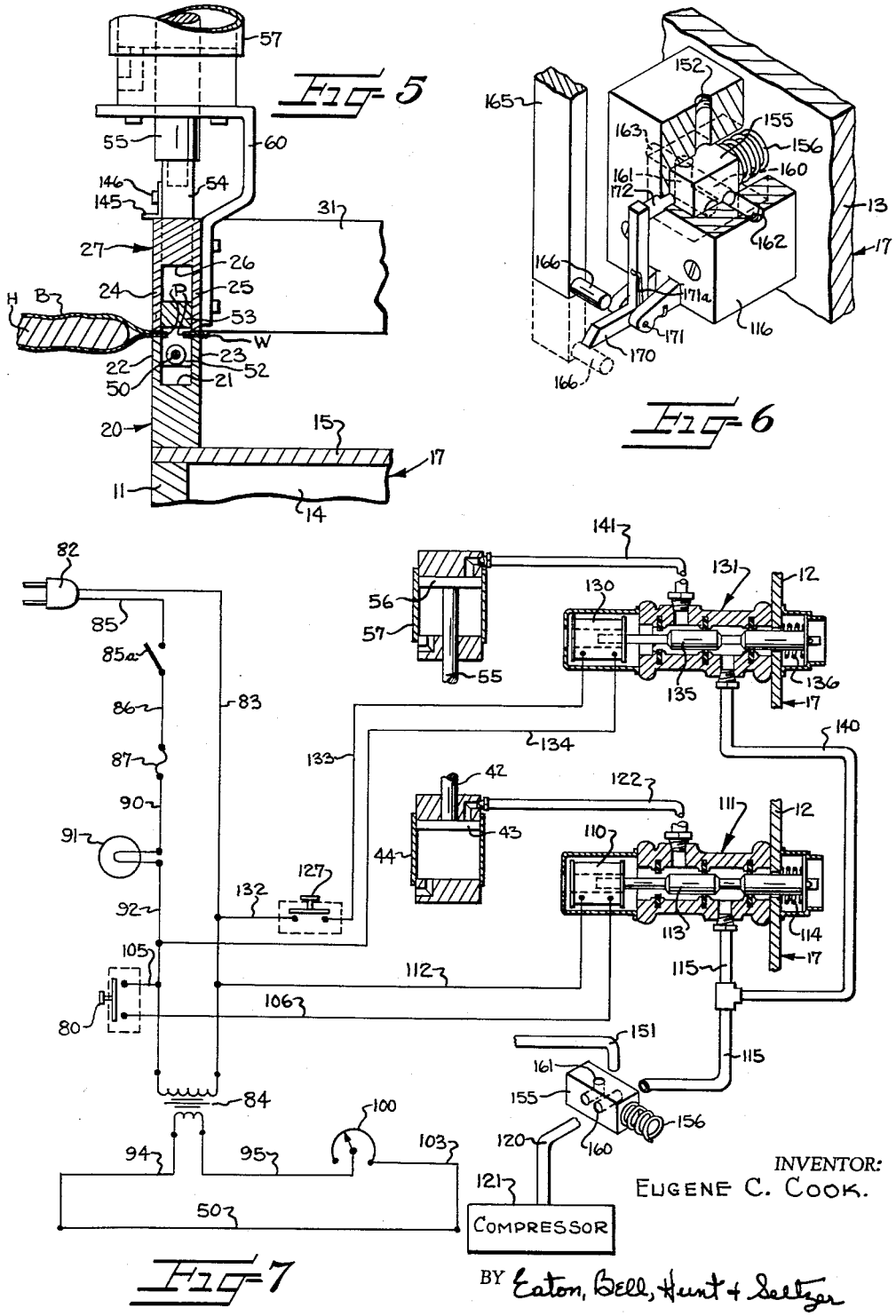

Jan. 2, 1962 E. C. COOK 3,015,600
PLASTIC FILM CUTTER AND SEALER
Filed Feb. 4, 1957 4 Sheets-Sheet 4
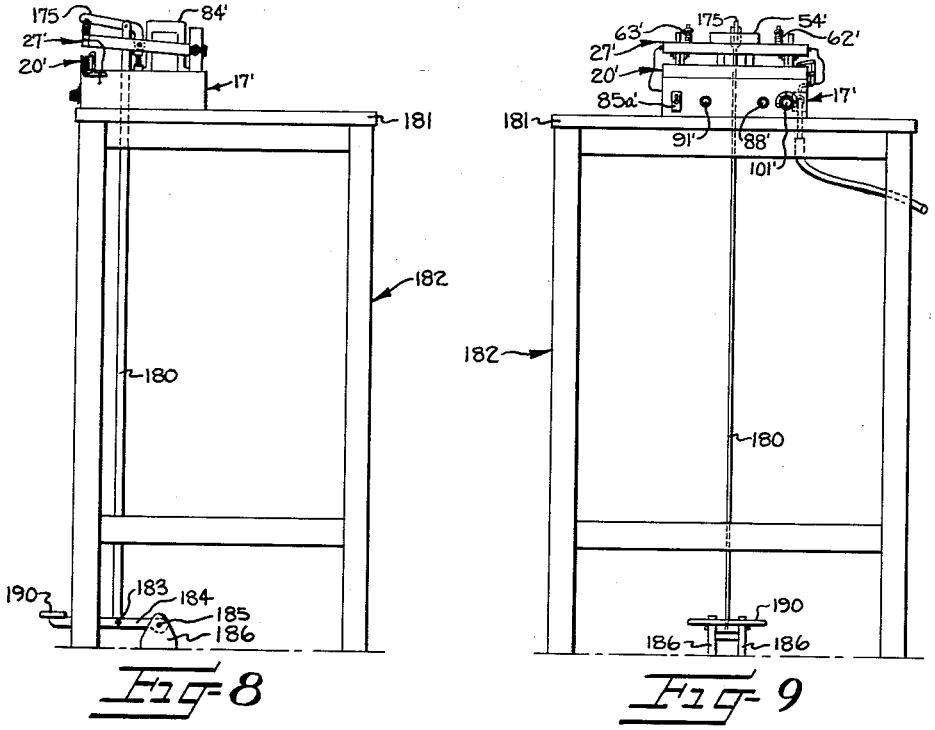
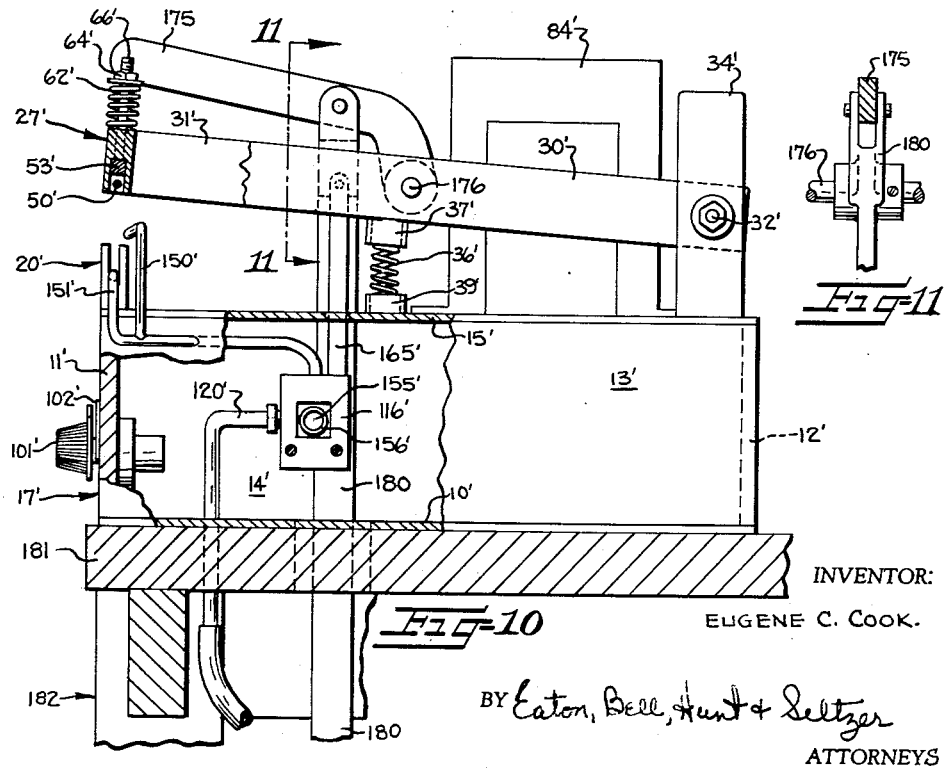
INVENTOR:
EUGENE C. COOK.
BY Eaton, Bell, Hunt & Seltzer
ATTORNEYS

United States Patent Office 3,015,600
Patented Jan. 2, 1962

3,015,600
PLASTIC FILM CUTTER AND SEALER
Eugene C. Cook, Concord, N.C., assignor to Cook Engineering and Electronics, Inc., Concord, N.C., a corporation of North Carolina
Filed Feb. 4, 1957, Ser. No. 638,136
14 Claims. (Cl. 156—356)

This invention relates generally to an apparatus and method of simultaneously cutting and heat-sealing sheets of plastic material.

It is an object of this invention to provide a compact machine provided with a heated element, which may be an electrical resistance wire, and means for passing the heated element through the plastic sheets to thereby cut the plastic sheets and simultaneously heat-sealing the cut edges of the sheets together.

It is another object of this invention to provide a machine for cutting and sealing plastic film material which includes means for clamping and holding the sheets of plastic material in a fixed position during the time the sheets are cut and heat-sealed and which clamping means will operate automatically upon actuation of the machine.

It is another object of this invention to provide a plastic sheet cutting and heat-sealing machine having means for clampingly holding the plastic sheets in a fixed position during the cutting and sealing operation which may also be provided with ejecting means for removing the trimmed or surplus material cut by the heated element which is automatically operable upon releasing the clamping means for holding the sheets.

The present machine is particularly adapted to cut and heat-seal the open end of bags, such as are used to package hosiery, but is not limited to this use since it may be used to form the bags by cutting and heat-sealing, at spaced intervals, a folded longitudinal strip of the plastic material to form the sides of the bags. Thus, this machine may be utilized in the manufacture of articles made of plastic sheets as well as in the packaging of goods in the bags. The present machine will cut and heat-seal any type of thermoplastic film capable of being heated to a melting point without flaming, an example being polyethylene.

Some of the objects of the invention having been stated, other objects will appear as the description proceeds when taken in connection with the accompanying drawings, in which—

FIGURE 1 is a right-hand side elevation of the machine with some of the parts broken away for purposes of clarity;

FIGURE 2 is a plan view of the machine shown in FIGURE 1 and showing a bag in position to be clamped, cut and heat-sealed;

FIGURE 5 is an enlarged fragmentary vertical sectional view taken substantially along the line 5—5 in FIGURE 3 and showing a bag which has just been cut and heat-sealed;

FIGURE 6 is an isometric view with parts in section of the air valve mechanism shown in the lower right-hand corner of FIGURE 4;

FIGURE 7 is a schematic diagram showing the electrical and fluid pressure circuits of the machine;

FIGURE 8 is a right-hand side elevation of a modified form of the machine showing a foot operated control therefor;

FIGURE 9 is a front elevation of the modified machine shown in FIGURE 8;

FIGURE 10 is a right-hand side elevation at an enlarged scale with parts broken away and with other parts in section for purposes of clarity;

FIGURE 11 is a fragmentary vertical sectional view taken substantially along the line 11—11 in FIGURE 10.

Figure 3:
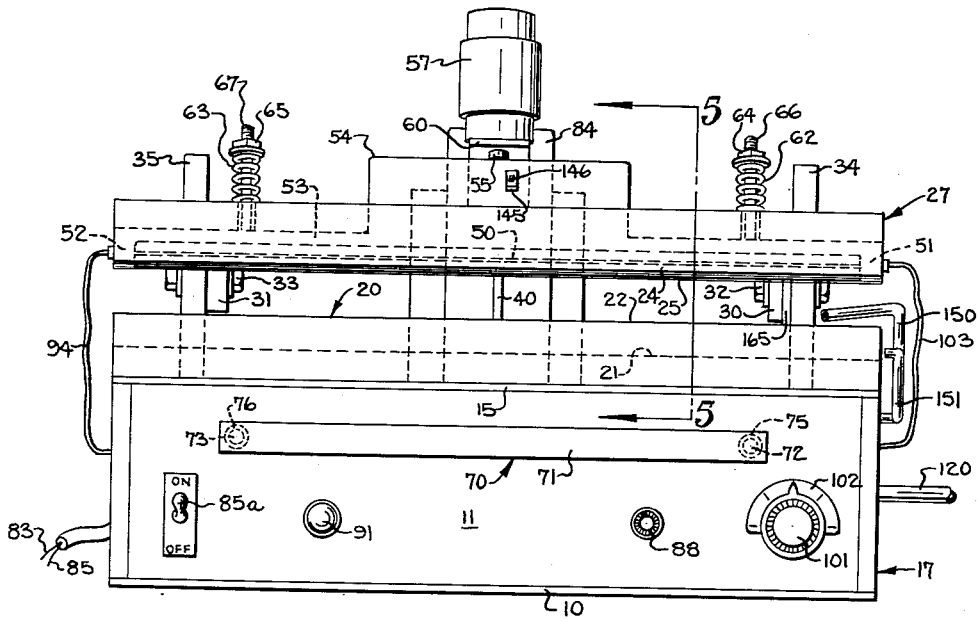
FIGURE 3 is a front elevation of the machine ready to receive a bag for sealing.

Referring more specifically to the drawings, the first form of invention is shown in FIGURES 1 through 7 and comprises a base or bottom 10 having the lower ends of upstanding respective front and rear walls 11 and 12 and side walls 13 and 14 fixed thereto. The upper ends of the walls 11, 12, 13 and 14 have a cover or top 15 suitably secured thereto to define a box or housing, indicated broadly at 17. A first or lower jaw 20 is fixed to the top of and adjacent the front edge of the top plate 15 (FIGURES 3 and 5) and extends the width of the plate 15. The jaw 20 is provided with a longitudinally extending, heating element receiving groove 21 defining respective front and rear upstanding lip portions 22 and 23 thereon. The front and rear lips 22 and 23 are adapted to, at times, mate with and be clampingly engaged by respective front and rear lips 24 and 25 of a second or upper jaw broadly referred to at 27 and the lips 24 and 25 are spaced from each other by a groove 26 in the jaw 27. The jaw 27 is substantially the same length as the lower jaw 20 and is supported adjacent opposite ends for vertical movement on the front ends of a pair of rearwardly extending support arms 30 and 31 (FIGURE 2), the respective rear ends of which are oscillatably mounted as at 32 and 33 on upstanding supports 34 and 35. The lower ends of the supports 34 and 35 are fixed on the upper rear edge top plate 15 of the housing 17. The arms 30 and 31 are normally urged upwardly, along with the jaw 27, by compression springs 36, only one of which is shown in FIGURE 1, the upper ends of which are suitably mounted in spring seats 37 and 38 fixed on the lower edges of the respective arms 30 and 31, the lower ends of the springs 36 being suitably secured in spring seats 39 fixed on the top plate 15.

Figure 4:
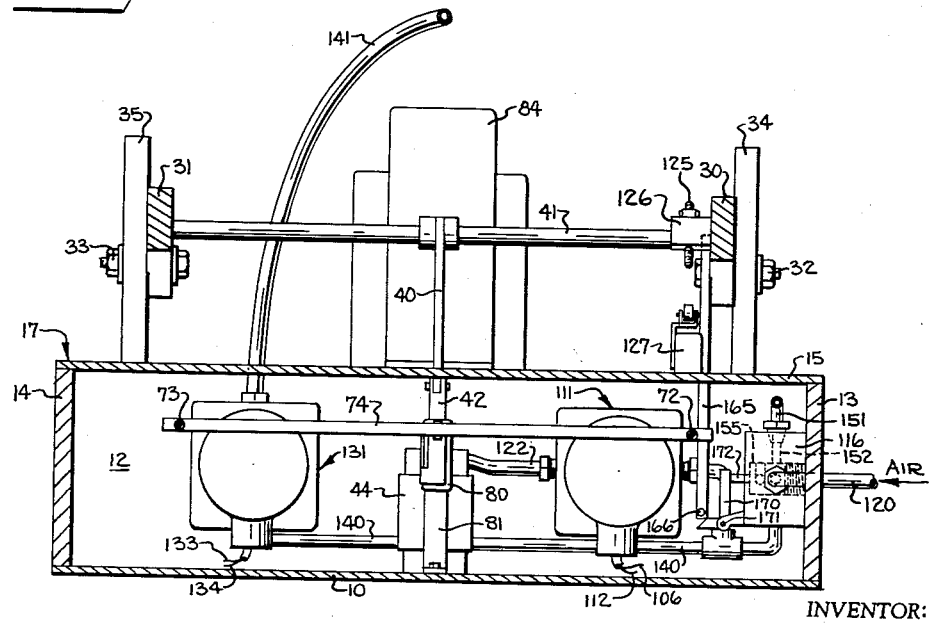
FIGURE 4 is a vertical sectional view taken substantially along the line 4—4 in FIGURE 1.

The upper jaw 27 may be moved from the position shown in FIGURE 1 to the clamping position shown in FIGURE 5 by a link 40, the upper end of which is oscillatably mounted on the medial portion of a rod 41, the opposite ends of which are fixed in the arms 30 and 31 (FIGURES 1, 2 and 4). The medial portion of the link 40 penetrates the top plate 15 and the lower end of the link 40 is suitably secured to the upper end of a piston rod 42 which has a piston 43 integral therewith (FIGURE 7) and which piston is mounted for vertical movement in an air operated cylinder 44. The piston 43 in the cylinder 44 is adapted to be operated by suitable air or other fluid pressure, controlled in a manner to be later described, and the cylinder 44 may be fixed on the bottom 10 (FIGURES 1 and 2) of the housing 17.

The upper jaw 27 is also provided with a vertically movable heating element which may be in the form of a resistance wire 50. Opposite ends of the wire 50 are suitably secured in and insulated from downwardly extending portions 51 and 52 at opposite ends of a heating element support bar 53 mounted for vertical sliding movement in the jaw 27 (FIGURE 3). The bar 53 is provided with an upstanding portion 54 which is slidably mounted in a groove communicating with the groove 26 and the portion 54 extends above the upper jaw 27 and has the lower end of the piston rod 55 suitably secured therein. The upper end of the piston rod 55 is provided with a suitable piston 56 slidably mounted for vertical movement in a conventional air cylinder 57 (FIGURE 7) which is suitably mounted in spaced relation to and above the upper jaw 27 by a support bracket 60 (FIGURES 1 and 5). The heating element support bar 53 is normally urged upwardly, to the position shown in FIGURES 1 and 3, by a pair of compression springs 62 and 63 spaced apart from each other and adjacent opposite ends of the upper jaw 27. The springs 62 and 63 surround respective upstanding stem members 66 and 67, the lower ends of which are suitably secured in the upper edges of the heating element supporting bar 53 and which have vertical sliding movement in the upper jaw 27. The lower ends of the springs 62 and 63 engage the upper edge of the jaw 27 and the upper ends engage respective adjustable abutments 64 and 65, shown as washers and nuts threaded on the upper ends of the stem members 66 and 67. The springs 62 and 63 thus hold the bar 53 in the upper position and the piston 56 in the cylinder 57 may be actuated, when desired, to move the heating element supporting bar 53 downwardly relative to the upper jaw 27, by suitable control valves and switches to be later described. Operation of the machine is controlled by actuator means broadly indicated at 70 which includes a manually movable bar 71 mounted in spaced parallel relationship to the front 11 and opposite ends of which are supported on the front ends of shouldered guiding pins 72 and 73. The medial portions of the pins 72 and 73 are slidably mounted in the front plate 11 and the inner ends of which extend inside of the compartment or box 17 and are secured to opposite ends of a bar 74 (FIGURE 4). The contact bar 71 and the guiding pins 72 and 73 are normally urged outwardly away from the front plate 11 by respective compression springs 75 and 76 which surround the guiding pins 72 and 73 and one end of each of which engages the contact bar 71 and the opposite ends of which engage the front plate 11 of the compartment 17. Upon inward movement of the bar 71, by an operator, the bar 74 will contact and close a normally open electrical switch 80 (FIGURES 1, 2, 4 and 7) suitably supported on the upper end of a support bracket 81, the lower end of which is suitably mounted on the base or bottom 10.

The diagram, shown in FIGURE 7, includes a male plug 82 (FIGURE 7) which may be suitably connected to any source of electrical energy, not shown, a wire 83, one end of which is connected to the plug 82 and the other end of which is suitably connected to one side of a transformer 84, a lead wire 85 one end of which is connected to the plug 82 and the opposite end of which is connected to one side of a manually operable switch 85a, shown mounted on the front plate 11 (FIGURES 2 and 3), and which may be termed as a master switch to completely disconnect the electrical circuit of the machine from the source of electrical energy. The diagram also includes a wire 86 one end of which is connected to the switch 85a and the opposite end of which is connected at one side of a suitable safety element or fuse 87, which may also be mounted for easy replacement in a conventional fuse holder 88 (FIGURES 2 and 3) in the front plate 11. The opposite side of the fuse 87 has one end of a wire 90 connected thereto and the opposite end of which is connected to one side of a signal light or bulb 91, which may also be suitably mounted in the front plate 11 (FIGURE 3). The opposite side of the light 91 has one end of a wire 92 connected thereto and the opposite end of which is connected to the side of the transformer 84 opposite the side to which the wire 83 is connected.

Thus, when the switch 85a is in closed position, an electrical circuit will be completed from the plug 82 to the input side of the transformer 84 to light the bulb 91. The output side of the transformer 84 has one end of a wire 94 connected to one side thereof and the opposite end of which is suitably connected to one end of the resistance wire 50, and the opposite side of the output side of the transformer 84 has one end of a wire 95 connected thereto and the opposite end of which is connected to the centralmost post or control arm of a rheostat 100. The rheostat 100 may be mounted in the front plate 11 and provided with an external handle or knob 101 having a pointer or indicator movable to different positions on an indicator dial or plate 102 (FIGURE 3) to vary the amount of voltage passing through the rheostat 100, as desired. The bridge of the rheostat 100 has one end of a wire 103 connected thereto and the opposite end of which is connected to the end of the wire 50 opposite that to which the wire 94 is connected. Upon the manually operable master switch 85a being closed, a circuit will be completed from the male plug 82, to the input side of the transformer 84 and a reduced voltage will be induced in the output side of the transformer 84 and carried to the resistant element or wire 50 to cause the same to be heated as long as the switch 85a remains closed, the indicator bulb 91 is lit to provide a visible means for the operator to determine whether or not the wire 50 is heated. The amount of heat created in the wire 50 may be varied depending upon the type of material to be cut and heat-sealed by the wire 50 by movement of the knob 101 of the rheostat 100 as desired.

With the master switch 85a in a closed position and upon closing the switch 80, by moving the bar 71 inwardly, a circuit will be completed from the wire 92, through a wire 105 one end of which is suitably connected intermediate the ends of the wire 92 and the other end of which is suitably connected to one side of the switch 80, a wire 106 one end of which is suitably secured to one side of the switch 80 and the opposite end of which is suitably secured to one side of a solenoid coil 110 mounted in a jaw operating valve broadly designated at 111, a wire 112 connected to the side of the coil 110 opposite that to which the wire 106 is connected, and to the wire 83. A valve plunger 113, in the jaw operating valve 111, is normally urged to the position shown in FIGURE 7 by a spring unit 114 connected to one end of the valve member 113 and the jaw operating valve 111 is suitably secured to the rear wall 12 with the spring unit 114 being disposed outside of the compartment or box 17.

The jaw operating valve 111 is provided with an air inlet line or pipe 115, the opposite end of which is suitably connected to one side of an air blowing valve 116 mounted on the side wall 13 (FIGURES 1, 2, 6 and 7) and used to eject or remove any excess plastic film remaining on the jaw 20 following the cutting and heat-sealing operation, in a manner to be later described. The opposite side of the valve 116 is provided with an air intake line 120, the opposite end of which extends outwardly through the side wall 13 and is suitably connected to any source of compressed air, such as a compressor indicated schematically in FIGURE 7 at 121. The side of the jaw opening valve 111 opposite that to which the inlet line 115 is connected has one end of a pipe 122 connected thereto and the opposite end of which is connected to the upper side of the air cylinder 44.

Thus, upon closing the electrical switch 80, the solenoid 110 will be energized, in a manner previously described, to move the valve plunger 113 from right to left in FIGURE 7, and allow air to enter through the pipe 115, through the valve 111, pipe 122 and into the upper part of the cylinder 44 and thus move the piston 43 and the piston rod 42 downwardly. The link 40 will be lowered to move the lips 24 and 25 of the upper jaw 27 into engagement with the respective lips 22 and 23 of the lower jaw 20 under any desired pressure, regulated by the air pressure in the air line 120. If plastic material, such as the open end of a bag B, illustrated in FIGURE 5 and into which articles such as hose H are inserted, is placed on the lower jaw 20 before lowering the jaw 27, the material will be clamped between the upper jaw 27 and the lower jaw 20 as long as the switch 80 remains in a closed position to energize the coil 110 in the jaw operating valve 111.

As the upper jaw 27 is moved into clamping position, or from the position shown in FIGURE 1 to the position shown in FIGURE 5, an adjustable abutment, in the form of a screw 125 (FIGURES 1, 2 and 4) threadably mounted in a projection 126 on the arm 30, engages and closes a normally open switch 127. Upon closing the switch 127 an electrical circuit is completed to a solenoid coil 130 mounted in a cutting element or wire operating valve, broadly referred to at 131 (FIGURE 7). The circuit to the coil 130 is completed through a wire 132, one end of which is connected intermediate the ends of the wire 83 and the opposite end of which is connected to one side of the switch 127, a wire 133, one end of which is connected to one side of the switch 127 and the other end of which is connected to the solenoid coil 130, and to a wire 134, one end of which is connected to one side of the solenoid coil 130 and the opposite end of which is connected intermediate the ends of the wire 92. Thus, downward movement of the upper jaw 27 will energize the coil 130 of the wire operating valve 131 and cause a valve plunger 135 therein to be moved from right to left in FIGURE 7. The valve plunger 135 is normally urged to the right or to the position shown in FIGURE 7 by a spring unit 136 mounted on one end of the valve 131. The valve 131 is spaced from the valve 111 in the housing 17 and is secured to the rear wall 12 in the same manner as the valve 111.

An air inlet pipe 140 is connected to the inlet side of the wire operating valve 131 and the opposite end of which is connected intermediate the ends of the pipe 115. One end of a pipe 141 is connected to the other side of the wire operating valve 131 and the opposite end of the pipe 141 is connected to the upper side of the air cylinder 57. Thus, upon downward movement of the upper jaw 27, the switch 127 will be closed to energize the coil 130, move the valve plunger 135 from right to left in FIGURE 7, and allow air under pressure to enter through the pipe 140, pass through the valve 131, into the pipe 141 and cause the piston 56 and the piston rod 55 to be moved downwardly and thereby move the heating element holding bar 53 and the heating element 50 downwardly into the groove 21 in the lower jaw 20. Upon downward movement of the element 50, the top of the bag B will be trimmed and simultaneously heat-sealed, at P to cut and seal the two sheets of plastic material P leaving a relatively narrow piece of excess material or waste W clamped between the lips 23 and 25. Downward movement of the heating element 50 and the bar 53 may be limited by a clip or stop 145 (FIGURES 3 and 5) mounted for vertical adjustment on the upstanding portion 54 of the heating element holding bar 53 in any suitable manner such as by a screw 146.

Upon releasing the contact bar 71 so that the springs 72 and 73 may move the same to the inoperative position shown in FIGURE 2, the switch 80 will open to break the electrical circuit to the solenoid 110. The spring unit 114 may then move the valve plunger 113 of the jaw operating valve 111 to the position shown in FIGURE 7, thereby shutting off the air pressure being applied to the upper side of the piston 43 and allowing the springs 36 to raise the arms 30 and 31 along with the upper jaw 27 to its uppermost position. As the arms 30 and 31 raise the upper jaw 27, the abutment 125 will move out of engagement with the switch 127 thus allowing the switch 127 to open and break the electrical circuit to the solenoid 130. The spring unit 136 may then move the valve plunger 135 of the wire operating valve 131 to the right or to the position shown in FIGURE 7 and the springs 62 and 63 will move the heating element holding bar 53 and heating element 50 upwardly in the jaw 27 to the position shown in FIGURE 1. When the bar 53 is raised, the piston 56 in the cylinder 57 will move upwardly and air above the piston 56 may escape through the pipe 141, the wire operating valve 131 and through a suitable opening in the housing surrounding the solenoid 130 to the atmosphere.

The machine thus far described is provided with electrically controlled fluid pressure means for automatically clamping sheets of plastic film material, such as polyethylene, and holding the same while simultaneously cutting and heat-sealing the cut edges of the sheets of plastic material. Ordinarily after releasing the clamping engagement between the upper jaw 27 and the lower jaw 20, the strip of excess waste W trimmed therefrom would be free to fall into the groove 21 or to remain on the rear lip 23 of the lower jaw 20. In order to remove this strip of waste W, automatic ejecting means in the form of an air jet may be employed and the direction of the air may be controlled by a pair of air lines or pipes 150 and 151. The open end of the pipe 150 may be directed to blow along the lip 23 of the lower jaw 20 and the open end of the pipe 151 may be directed to blow a jet of air through the groove 21 in the lower jaw 20. The lower end of the pipe 150 may be joined intermediate the ends of the pipe 151, the pipe 151 being connected to an outlet port 152 of the valve 116 (FIGURES 2 and 6). The valve 116 is provided with a movable piston 155 normally urged to the position shown in FIGURE 6 by a compression spring 156. The piston 155 is provided with a pair of passageways or ports 160 and 161, the passageway 160 extending horizontally, in FIGURE 6, to aline an intake port 162, to which the intake line 120 is connected with an outlet port 163 to which the line 115 is connected. Thus, with the piston 155 in the position shown in FIGURE 6, air may enter through the pipe 120, port 162, passageway 160, port 163 and into the line 115.

In order to move the piston 155 to its rearmost position or to a position so that the port 162 will aline the L-shaped passageway 161 with the port 152 to provide air in the pipes 150 and 151, a suitable downwardly extending arm or link 165 (FIGURES 1 and 6) is provided, the upper end of which is oscillatably mounted on the support arm 30 of the upper jaw 27. The arm 165 extends downwardly through the top 15 and the lower end thereof is provided with an outwardly extending pin 166 (FIGURE 6) adapted to, at times, engage the horizontal arm of a trip lever 170. The trip lever 170 has an inclined surface on its outer end so that upon downward movement of the arm 165, along with downward movement of the upper jaw 27 and the support arm 30, the pin 166 will merely move past the trip lever 170 to the position shown in dotted lines in FIGURE 6. The lever 170 is oscillatably mounted as at 171 on outwardly extending portions of the housing of the valve 116 and urged in a clockwise direction by a spring 171a. The upper leg or vertical leg of the trip lever 170 is adapted to engage, and at times, depress an operating pin 172, the inner end of which is integral with the piston 155. Thus, upon upward movement of the arm 165, from the position shown in dotted lines in FIGURE 6 to the position shown in solid lines in FIGURE 6, the lower surface of the horizontal arm of the trip lever 170 will be engaged by the pin 166 to move the trip lever 170 in a clockwise direction, thus depressing the pin 172 and moving the piston 155 rearwardly of the position shown in FIGURE 6 so that the intake port 162 will be alined with the L-shaped passageway 161 to allow air to be ejected through the pipes 150 and 151 each time that the upper jaw 27 is moved from its lowered or clamping position to a raised position, as shown in FIGURE 1. It is apparent that the air stream ejected through the pipes 150 and 151 will also serve to cool the jaws 20 and 27.

Thus, the machine shown in FIGURES 1 through 7 will automatically, upon pressing the contact bar 71, clamp the edge of an article, such as the bag B, placed on the jaw 20 and hold the same in rigid position while simultaneously cutting and heat-sealing the top of the bag B at the desired location. Although the upper jaw 27 is shown as being mounted to travel an arcuate path as it is moved into and out of engagement with the lower jaw 20, it is to be understood that the upper jaw 27 may be mounted to move vertically above the lower jaw 20, if desired.

The modified form of the machine, shown in FIGURES 8 through 11, may be used for the same purpose as the machine of the first form with the difference being that mechanical means are provided to move the upper jaw into engagement with the lower jaw and to move the heating element to lowered trimming and heat-sealing position. Since many of the parts in the second form of the invention are identical to corresponding parts in the first form of the invention, the identical parts will bear the same reference characters with the prime notation added. The upstanding portion 54' of the heating element holding bar 53' is engaged by the free end of a lever 175, the opposite end of which is mounted on and intermediate the ends of a transversely extending shaft 176, the opposite ends of which are oscillatably mounted in the respective support arms 30' and 31' supporting the upper jaw 27'. The upper bifurcated end of a connecting link 180 is oscillatably connected intermediate the ends of the lever 175, the link 180 extending downwardly through the top plate 15' of the housing 17' and the top 181 of a suitable support table broadly indicated at 182. The lower end of the link 180 is connected as at 183 intermediate the ends of a lever 184. One end of the lever 184 is oscillatably mounted as at 185 between a pair of standards 186 suitably secured to the floor beneath the table 182 and the free end of the lever 184 is provided with a foot treadle 190 for engagement by the foot of an operator.

As the treadle 190 is depressed, downward movement will be imparted to the link 180 and the arms 30' and 31' along with the upper jaw 27' to move the jaw 27' to clamp the top of the bag B against the lower jaw 20'. After clamping engagement has been made between the upper jaw 27' and the lower jaw 20', upon the continued downward movement of the connecting link 180, the free end of the lever 175 will be lowered against the upward pressure of the springs 62' and 63' which normally hold the heating element holding member 53' upwardly in the position shown in FIGURE 10. Lowering the lever 175 relative to the jaw 27' will lower the heating element 50' and the heating element holding member 53' while maintaining the clamping engagement between the upper jaw 27' and the lower jaw 20' to thus cut and simultaneously heat-seal the top of the bag B.

If desired, a waste ejecting means may be applied to the modified form of invention which may be similar to the ejecting means shown in the first form. In this case the waste ejecting means comprises air pipes 150' and 151' which are connected to a valve mechanism 116' which may be identical to the valve mechanism 116 or which may be modified slightly so that the movable piston 155' therein includes only the L-shaped passageway 161. The valve 116' is provided with an air intake line 120' leading into the housing 17' and which may be connected to any suitable source of compressed air, not shown. The mechanism for operating the valve 116' may be identical to that shown in FIGURE 6 and may be operated from a link 165', the upper end of which is oscillatably mounted on the support arm 30' supporting the upper jaw 27'. Air may be ejected from the pipes 150' and 151', in the same manner as described for the first form of the invention, to blow away or eject the waste W trimmed from the top of the bag B each time the upper jaw 27' is moved away from the lower jaw 20' to release the waste W while also cooling the jaws.

Thus the modified form of the invention shown in FIGURES 8 through 11, carries out the cutting and heat-sealing operation in an identical manner to the cutting and heat-sealing operation in the first form but the operation is carried out by mechanical linkage in the second form.

In the drawings and specification there have been set forth preferred embodiments of the invention and, although specific terms are employed, they are used in a generic and descriptive sense only and not for purposes of limitation, the scope of the invention being defined in the claims.

I claim:
1. An apparatus for simultaneously cutting and heat-sealing thermoplastic sheet material comprising a housing, a first jaw member fixed on said housing, a second movable jaw member, means for moving said second jaw toward said first jaw to clamp said thermoplastic material between said jaws, resilient means for moving said second jaw away from said first jaw, a heating element supported in said second jaw member, and means controlled by movement of said second jaw toward said first jaw for moving said heating element relative to said second jaw, through said thermoplastic sheet material and into said first jaw.

2. An apparatus for simultaneously trimming and heat-sealing thermoplastic sheet material comprising a housing, a first jaw member fixed on said housing, a second jaw member movable into and out of engagement with said first jaw member, a first air cylinder, a link connecting said second jaw member and said first air cylinder, means for actuating said first air cylinder to move said second jaw toward said first jaw member and clamp said thermoplastic material between said jaws, a heating element supported in said second jaw member, a second air cylinder mounted on said second jaw member and connected to said heating element, and means under control of movement of said second jaw toward said first jaw for actuating said second air cylinder to move said heating element relative to said second jaw, through said thermoplastic sheet material and into said first jaw.

3. An apparatus for simultaneously cutting and heat-sealing thermoplastic sheet material comprising a housing, a first jaw member fixed on said housing, a second jaw member, arms supporting said second jaw member for movement of said second jaw member into and out of engagement with said first jaw member, a heating element support mounted in said second jaw member, a heating element carried by said second jaw member in said heating element support and movable from said second jaw into said first jaw upon movement of said second jaw into engagement with said first jaw, a lever engaging said heating element support and mounted on said arms supporting said second jaw member, a link connected to said lever, and means for actuating said link.

4. An apparatus for simultaneously trimming and heat-sealing the open end of thermoplastic bags made from sheets of thermoplastic material comprising a first fixed clamping jaw, a second movable clamping jaw movable into and out of engagement with said first jaw, a heating element mounted for movement in said second clamping jaw, support arms on said second jaw, means for moving said support arms to move said second jaw into and out of clamping engagement with said first jaw, and means operable in response to movement of said second jaw into clamping engagement with said first jaw for moving said heating element from said second jaw, through said thermoplastic sheets and into said first jaw.

5. An apparatus for severing and heat-sealing thermoplastic sheets comprising a lower fixed jaw, an upper movable jaw adapted to mate with said lower jaw, a heating element in said upper jaw, a housing supporting said lower jaw, support arms on said upper jaw, means in said housing for effecting movement of said support arms, means operable in response to movement of said support arms for moving said heating element through the sheets of thermoplastic material, and means operable in response to movement of said upper jaw away from said lower jaw for releasing air along said lower jaw.

6. An apparatus for severing and heat-sealing thermoplastic sheets comprising a lower fixed jaw, an upper movable jaw adapted to mate with said lower jaw, a heating element in said upper jaw, a housing supporting said lower jaw, support arms on said upper jaw, a first air cylinder in said housing and connected to said support arms for moving said upper jaw toward said lower jaw, resilient means connected to said support arms for moving said upper jaw away from said lower jaw, means operable in response to movement of said upper jaw toward said lower jaw for moving said heating element through the sheets of thermoplastic material, and means operable in response to movement of said upper jaw away from said lower jaw for releasing air along said lower jaw.

7. An apparatus for severing and heat-sealing thermoplastic sheets comprising a lower fixed jaw and an upper movable jaw adapted to mate with said lower jaw, a heating element in said upper jaw, a housing supporting said lower jaw, support arms on said upper jaw, linkage connected to said support arms for manually moving said upper jaw toward said lower jaw and said heating element through the sheets of thermoplastic material and resilient means connected to said support arms for moving said upper jaw away from said lower jaw, and means operable in response to movement of said upper jaw away from said lower jaw for releasing air along said lower jaw.

8. An apparatus for simultaneously severing and heat-sealing thermoplastic sheet material comprising a housing, a first jaw member fixed on said housing, front and rear lips on said first jaw, a second jaw member movable into and out of engagement with said first jaw member, front and rear lips on said second jaw member adapted to mate with the lips on the first jaw, a heating element resiliently supported in said second jaw member and between said lips, means for moving said second jaw towards said first jaw to clamp said thermoplastic material between the lips of said jaws, and means operable in response to movement of said second jaw into clamping engagement with said first jaw for moving said heating element from said second jaw, through said thermoplastic sheet material and into said first jaw.

9. An apparatus for simultaneously severing and heat-sealing thermoplastic sheet material comprising a housing, a first jaw member fixed on said housing, front and rear lips on said first jaw, a second jaw member movable into and out of engagement with said first jaw member, front and rear lips on said second jaw member adapted to mate with the lips on the first jaw, a heating element resiliently supported in said second jaw member and between said lips, a first air cylinder connected to said second jaw for moving said second jaw toward said first jaw to clamp said thermoplastic material between the lips of said jaws, resilient means connected to said second jaw for moving said second jaw away from said first jaw, and means operable in response to movement of said second jaw into clamping engagement with said first jaw for moving said heating element from said second jaw, through said thermoplastic sheet material and into said first jaw.

10. An apparatus for simultaneously severing and heat-sealing thermoplastic sheet material comprising a housing, a first jaw member fixed on said housing, front and rear lips on said first jaw, a second jaw member movable into and out of engagement with said first jaw member, front and rear lips on said second jaw member adapted to mate with the lips on the first jaw, a heating element resiliently supported in said second jaw member and between said lips, linkage connected to said second jaw for manually moving said second jaw toward said first jaw to clamp said thermoplastic material between the lips of said jaws, resilient means connected to said second jaw for moving said second jaw away from said first jaw, and means operable in response to movement of said second jaw into clamping engagement with said first jaw for moving said heating element from said second jaw, through said thermoplastic sheet material and into said first jaw.

11. An apparatus for severing and heat-sealing thermoplastic sheets comprising a lower jaw upon which the sheets are adapted to be placed in superimposed relationship, an upper jaw movable toward said lower jaw, means operable upon movement of said upper jaw toward said lower jaw to cut and heat-seal the thermoplastic sheets, and means operable in response to movement of said upper jaw away from said lower jaw for supplying and directing an air stream along said lower jaw when said upper jaw has been moved away therefrom to blow away waste thermoplastic material.

12. An apparatus for severing and heat-sealing thermoplastic sheets comprising a lower jaw upon which the sheets are adapted to be placed in superimposed relationship, an upper jaw, a housing supporting said lower jaw, support arms on said upper jaw pivotally connected to said housing, a source of pneumatic pressure, pneumatically operable means in said housing communicating with said source and including an element connected to said support arms for moving said upper jaw toward said lower jaw, resilient means connected to said support arms for moving said upper jaw away from said lower jaw, severing means carried by said upper jaw and movable into engagement with the thermoplastic sheets, means to apply heat to the thermoplastic sheets along the area thereof in engagement with said severing means whereby said severing means may cut through the heated and softened portion of the thermoplastic sheets to effect a heat-sealed joint therebetween, and means operably connected to said source of pneumatic pressure to automatically supply and direct an air stream along said lower jaw upon movement of said upper jaw away from said lower jaw, whereby waste thermoplastic sheet material may be blown away.

13. An apparatus for simultaneously cutting and heat-sealing sheets of thermoplastic material comprising a first clamping jaw, a second clamping jaw, means inducing relative movement of said first and second jaws toward each other for clamping the thermoplastic sheets therebetween, a cutting and heat-sealing element in one of said first and second jaws, and means operable in response to relative movement of said first and second jaws toward each other for moving said cutting and heat-sealing element away from said one of said first and second jaws through the clamped sheets of thermoplastic material and into the other of said first and second jaws.

14. An apparatus for simultaneously severing and heat-sealing thermoplastic sheet material comprising a housing, a lower horizontally extending jaw member fixed on said housing, front and rear lips on said lower jaw member projecting vertically upward and coextensive with the horizontal extent of said lower jaw member, an upper horizontally extending jaw member movable toward and away from said lower jaw member, front and rear lips on said upper jaw member engageable with the lips on said lower jaw member for clamping thermoplastic sheet material therebetween, an elongated heating element between the front and rear lips in said upper jaw member, an elongated support bar mounted for slidable vertical movement between the front and rear lips in said upper jaw member, said support bar having downwardly extending portions at its opposite ends, the opposite ends of said heating element being secured in said downwardly extending portions of said support bar to space said heating element below the remainder of said support bar, means for moving said upper jaw member toward said lower jaw member to clamp the thermoplastic sheet material between the lips of said jaw members, means resiliently retaining said support bar in retracted position between the front and rear lips in said upper jaw member, means operable in response to movement of said upper jaw member toward said lower jaw member disposing the lips of said jaw members in clamping engagement for moving said support bar and said heating element carried thereby downwardly with respect to said upper jaw member to an extended position, and said downwardly extending portions of said support bar and said heating element secured thereto being disposed within said lower jaw member between said front and rear lips thereof in extended position, said heating element thereby passing completely through the clamped thermoplastic sheet material into the lower jaw member.

References Cited in the file of this patent

UNITED STATES PATENTS

| | | |
|---|---|---|
| 1,174,349 | Reynolds | Mar. 7, 1916 |
| 1,279,981 | Calderio | Sept. 24, 1918 |
| 2,232,640 | Schwartzman | Feb. 18, 1941 |
| 2,305,010 | Kenney et al. | Dec. 15, 1942 |
| 2,405,675 | Southwick | Aug. 13, 1946 |
| 2,627,213 | Nye | Feb. 3, 1953 |
| 2,638,964 | Andina | May 19, 1953 |
| 2,678,679 | Bergstein | May 18, 1954 |
| 2,711,779 | Carland | June 28, 1955 |
| 2,722,590 | Engler | Nov. 1, 1955 |
| 2,726,706 | Hakomaki | Dec. 13, 1955 |
| 2,732,881 | Anderle | Jan. 31, 1956 |
| 2,752,983 | George | July 3, 1956 |
| 2,786,511 | Reid | Mar. 26, 1957 |

FOREIGN PATENTS

| | | |
|---|---|---|
| 1,025,219 | France | Jan. 21, 1953 |
| 697,466 | Great Britain | Sept. 23, 1953 |
| 86,286 | Holland | Aug. 16, 1957 |